March 4, 1969 E. J. BORREBACH 3,431,344
CONTROL SYSTEM PROVIDING SUPPLY CIRCUIT IMPEDANCE BALANCE
CONTROL FOR ELECTRIC ARC FURNACES
Filed Nov. 15, 1965 Sheet 1 of 2
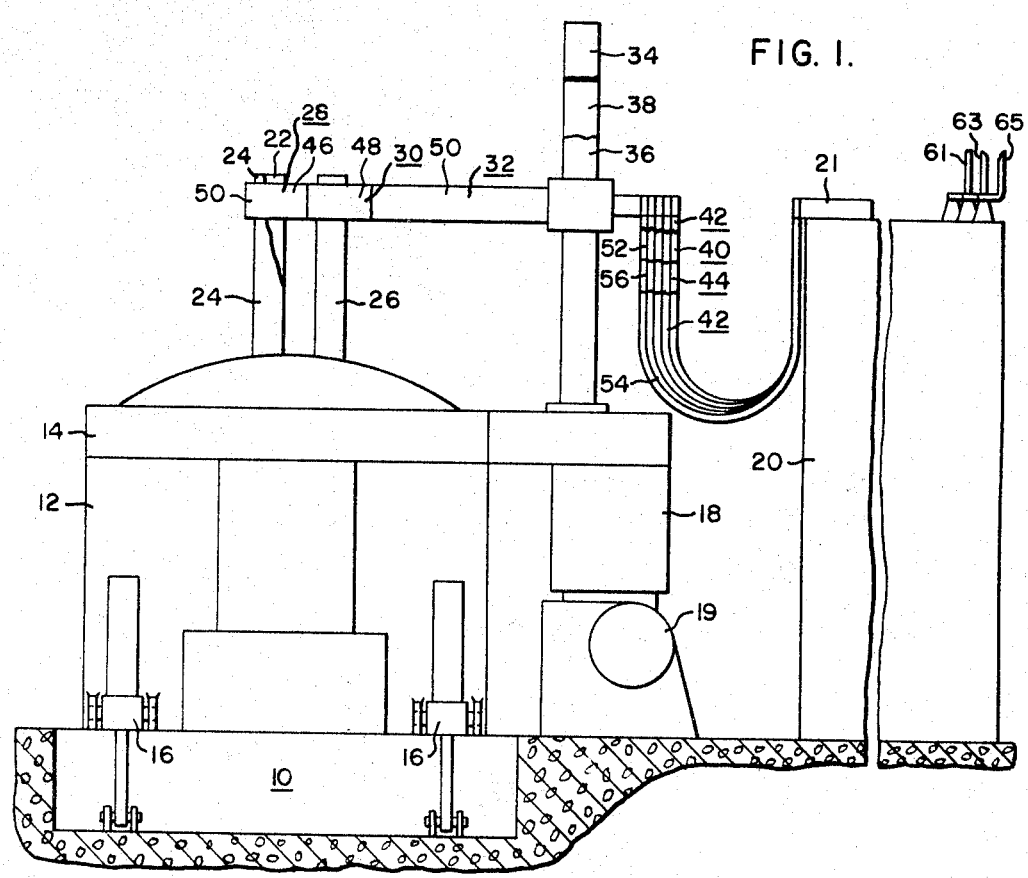
FIG. 1.
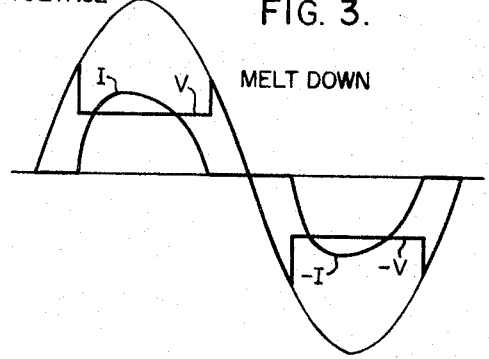
FIG. 3. MELT DOWN
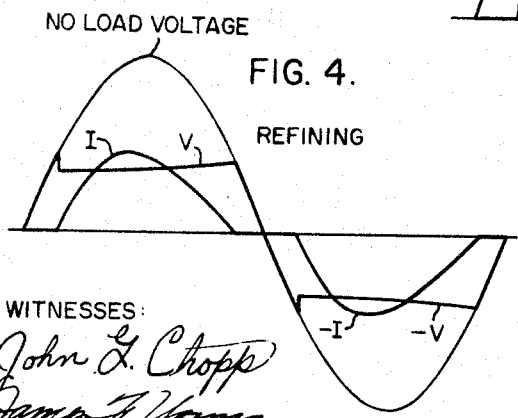
FIG. 4. REFINING
WITNESSES:
John L. Chopp
James F. Young
INVENTOR
Edwin J. Borrebach
BY E. F. Possessky
ATTORNEY

United States Patent Office 3,431,344
Patented Mar. 4, 1969

3,431,344
CONTROL SYSTEM PROVIDING SUPPLY CIRCUIT IMPEDANCE BALANCE CONTROL FOR ELECTRIC ARC FURNACES
Edwin J. Borrebach, Monroeville, Pa., assignor to Westinghouse Electric Corporation, Pittsburgh, Pa., a corporation of Pennsylvania
Filed Nov. 15, 1965, Ser. No. 507,931
U.S. Cl. 13—12
Int. Cl. H05b 7/18; H02p 13/04
8 Claims

ABSTRACT OF THE DISCLOSURE

A programmed digital computer control system operates phase impedance devices to produce phase supply circuit impedance balancing as furnace operations cause circuit conditions to vary in the supply circuits to a multiphase electric arc furnace. Furnace electrodes are positioned by computer control to satisfy furnace operating requirements and to maintain arc balance as the supply circuit impedances are balanced.

BACKGROUND OF THE INVENTION

The present invention relates to control systems for electric arc furnaces and more particularly to electric arc furnace control systems arranged to provide phase balancing.

Electric arc furnaces convert electric energy to heat energy for use in processing or melting and refining material in the furnace body. Arc current flows between the material and one or more graphite or other suitable electrodes in producing the process heat. The electric arc furnace is used in a wide variety of applications in the melting and smelting of such materials as copper, zinc, ferroalloys, steel, phosphorus and calcium carbide. In steelmaking, the electric arc furnace has particular advantages in economy and utility when a high percentage of scrap is included in the furnace charge. It is also advantageous when higher grade steels are to be refined since the chemistry of the furnace bath can be closely controlled.

The typical electric arc furnace is provided with three electrodes energized by a three-phase power supply. Single phase power supplies can be used as long as the electric power system can withstand the unbalanced loading that will arise. Other multiphase arrangements such as two-phase-four electrode and six-phase-six electrode arrangements are also possible but mechanical problems of electrode support have only difficult or impractical solutions since the furnace roof is supported for vertical movement in relation to the furnace body and the electrodes in turn must be supported for vertical movement through the furnace roof. The usual vacuum arc furnace which uses a DC power supply is outside the scope of the present invention. However, three electrode, three phase AC vacuum arc systems are possible and the present invention can be applied thereto.

Furnace power level is normally set by position regulation of the electrodes and by control of the arc supply voltage from a tap changing or other suitable transformer. Electrode position regulation is desirably made to maintain arc currents which provide efficient power transfer to the furnace at low power factor at the existing applied voltage.

In conventional three-phase electric arc furnaces, there is an impedance imbalance between phases that causes an unbalance of arc power, current, voltage or length. In turn, different heat generation characteristics are caused at the three electrode locations. Different arc lengths result in differential heating even if arc powers or currents are balanced because of difference in arc stability and other arc characteristics. Differential heat transfer from the electrode areas can result in hot spots on the refractory furnace lining material and resultant spot refractory erosion which foreshortens the lining life. Further, arc imbalance causes differential electrode consumption rates with resultant economic loss, and furnace melt down time is extended with productivity disadvantages because of the lower heat generation rate at the cooler electrode areas. Additional inefficiency stems from unbalanced transformer loading and unsatisfactory power factor operation, which often is too low on the heavily loaded electrode and too high on the lightly loaded electrode.

Because of the circuit impedance imbalance, it is normally impossible to balance arc power and current and voltage and length simultaneously. Only if the circuit impedances are balanced can all these parameters be balanced simultaneously in all the phase circuits.

Thus, if the electrode regulators continuously position the electrodes for equal arc currents in response to measured line current values, different arc lengths and/or arc powers are normally realized. On the other hand, if the electrode regulators continuously position the electrodes for equal arc powers in response to measured line power values, different arc lengths and/or arc currents are normally realized. Accordingly, total arc or phase balancing cannot be achieved by electrode position regulation alone since the imbalancing effects of the unbalanced system impedances cannot be offset.

Arc power or current or length imbalance is caused principally by impedance imbalance in the circuit lines used to connect the furnace transformer to the furnace electrodes. With equal line supply voltages, different line impedances result in different arc powers or currents or lengths or different combinations of these arc characteristics.

In the usual case, flexible cables formed from water or air cooled conductors extend from the transformer to support arms for the electrodes, and tubular cooled conductors connect the cables to the electrodes. The cables and tubular conductors extend in a flat or side-by-side array, and different mutual inductive couplings accordingly exist between the middle and outer conductors as compared to that between the outer conductors. Further, since the electrodes are normally placed in a triangular array, the physical length of one of the tubular conductors is shorter or longer than that of the other two and its self-inductance is therefore different. Harmonic components in the line currents can also cause reactance differences. High frequency skin effects are normally considered as having little effect on line resistance.

The following are typical empirically determined operating milliohm values of the line impedances for a flat array electric arc furnace, with phase sequencing in the order indicated:

$Z_C = 1.0 + j2.5 \times 10^{-3}$—Cold electrode (mutually induced voltage substantially bucks the line current)
$Z_B = 0.4 + j2.2 \times 10^{-3}$—Hot center electrode
$Z_A = 0.04 + j2.5 \times 10^{-3}$—Hot end electrode (mutually induced voltage substantially aids the line current)

The differences in resistance stem principally from the effects of phase displacements in the line currents, i.e., in accordance with well known circuit theory, vector resolution of mutually induced voltage affects line resistance as well as line reactance.

Appreciable decrease in impedance imbalance can be generally realized by placing the electrode supply conductors and cables in a triangular array as opposed to a flat array. However, the triangular array complicates already difficult mechanical support problems and, further, becomes ineffective when the triangular pattern is broken by relative movement of the electrodes. For example, in a steel electric arc furnace in which scrap is disposed for melt down, the electrodes can be regulated to different height levels in response to different scrap density conditions which result in differential melt down rates at the three electrode locations. Varying relative positioning of the electrodes results in varying inductive coupling among the lead-in lines and, accordingly, results in varying phase impedances. The basic cause of arc imbalance, namely phase impedance imbalance, thus continues to exist. The same adverse effect exists in the flat array geometry; that is, varying relative positioning of the electrodes results in varying phase resistances and phase reactances despite attempts to obtain a preset balanced condition. Unitary electrode movement in a triangulated array would substantially limit the impedance variation problem but such movement is ordinarily not possible. Other proposals for line geometry changes have disadvantages similar to those indicated for the triangular geometry.

In U.S. Patent 2,758,144 by L. Dreyfus, a choke is shown in the hot center phase for impedance balancing purposes. Since the outer phases have resistance differences, the preset compensation produced by the single center phase choke generally falls short of producing balanced impedance conditions. Further, as furnace operating conditions change to cause line impedance changes for the reasons indicated above, the line choke fails to compensate for the in-process impedance changes. It has also been proposed that chokes be placed in each of the phase lines to produce preset compensation, but arc imbalance occurs with uncompensated in-process line impedance changes, and, as in the single choke case, the unbalanced resistive components remain uncorrected.

SUMMARY OF THE INVENTION

In accordance with the principles of the present invention, a control system for a multiphase electric arc furnace includes a variable impedance device connected in at least one but preferably in each of two or more lines of the multiphase power supply. A meter system, responsive to predetermined line conditions, is connected in an adaptive feedback control system which substantially provides in-process balancing of phase impedances. Electrode position regulation thus results in substantially improved balancing of arc powers, voltages, currents and lengths as a result of the phase impedance balancing. Computer control of the electrode position regulation can be incorporated with the phase impedance balancing control. The computer then determines the phase imbalance on a continuing basis and adjusts the system reactance and the electrode positions as necessary to provide the balanced phase impedance condition.

It is therefore an object of the invention to provide a novel control system for a multiphase electric arc furnace which operates the furnace with improved efficiency.

Another object of the invention is to provide a novel control system for a multiphase electric arc furnace which operates the furnace with improved balancing of arc powers, currents, voltages, and lengths.

An additional object of the invention is to provide a novel control system for a multiphase electric arc furnace which operates the furnace with improved line impedance balancing.

A further object of the invention is to provide a novel adaptive feedback control system for a multiphase electric arc furnace which enables the furnace to be operated efficiently throughout its operating time period.

It is another object of the invention to provide a novel control system for a multiphase electric arc furnace which operates the furnace with reduced tendency to develop lining hot spots and with extended lining lifetime.

It is an additional object of the invention to provide a novel control system for a multiphase electric arc furnace which operates the furnace with reduced differential electrode consumption to provide extended electrode life.

These and other objects of the invention will become more apparent upon consideration of the following detailed description along with the attached drawings.

BRIEF DESCRIPTION OF THE DRAWINGS

FIGURE 1 shows a schematic diagram of a typical multiphase top charging electric arc furnace;

FIGS. 3 and 4 illustrate respective graphs showing typical arc current and voltage waveforms for different furnace operating periods.

DESCRIPTION OF THE PREFERRED EMBODIMENT

Figure 2:
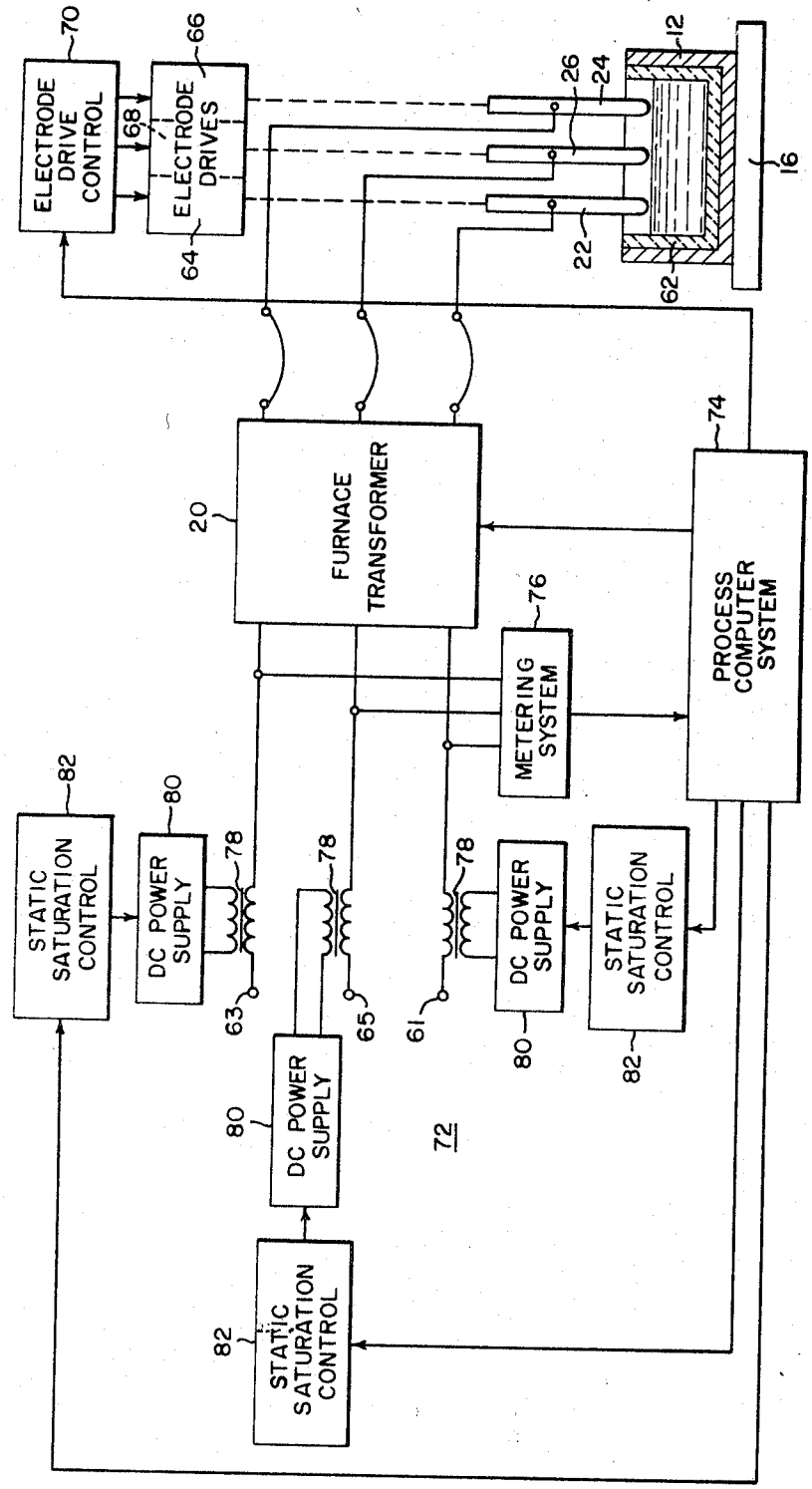
FIG. 2 shows a schematic diagram of an adaptive feedback control system arranged in accordance with the principles of the invention to control the furnace of FIG. 1.

More specifically, there is shown in FIG. 1 a conventional multiphase top charging electric arc furnace 10 having a shell or body 12 upon which a movable roof 14 is disposed. The furnace body 12 can have a diameter up to 20 feet or more. The roof 14 is supported so as to be movable in the vertical direction and away from the furnace body 12 for charging operations, as by means of a support arm 18 and a pivoting cylinder 19. The furnace 10 is supported on a platform 16 which can be tilted by suitable means to allow melts to be poured from the furnace body 12 after furnace processing.

The furnace 10 is in this instance provided with power from a transformer 20 having a deenergized type tap changer and connected to terminals 61, 63 and 65 of a three-phase power supply. Three electrodes 22, 24 and 26 are connected through cooled tubular conductors 46, 48 and 50 (not shown as separate structural elements) and a transformer delta closure 21 to the transformer 20 and are disposed for movement through the furnace roof 14 in controlling the power operating level of the furnace 10. The electrodes 22, 24 and 26 can be formed from graphite or other suitable material and can each have a diameter up to 2 feet or more. The transformer 20 may have a kva. rating as high as 80,000 kva. or more.

Respective electrode support arms 28, 30 and 32 extend generally horiontally over the furnace roof 14 from respective support beams or masts 34, 36 and 38 to support the electrodes 22, 24 and 26 in a predetermined array, usually in an equilateral triangular array as shown in FIG. 1. The electrode support arms 28, 30 and 32 are respectively clamped to the electrodes 22, 24 and 26 and insulated therefrom. In turn, the electrode support arms 28, 30 and 32 are suitably secured to the masts 34, 36 and 38 which are disposed for separate movement in the vertical direction to control the level at which the electrode bottom end faces (not shown) are disposed during furnace operation. The electrode insulation can be disposed between the electrodes and the support arms or between the latter and the masts.

The vertical masts are separately movable so that the electrodes 22, 24 and 26 can be disposed at different levels according to furnace operating needs. Each mast 34, 36 or 38 can be raised and lowered such as by a cable (not shown) controlled by a motor operated cable drum (not shown).

Electric energy is transferred from the transformer 20 to the electrodes 22, 24 and 26 through respective line connections 40, 42 and 44 including the respective cooled tubular conductors 46, 48 and 50 which extend along the support arms 28, 30 and 32 and flexible cables 52, 54 and 56 which connect the tubular conductors 46, 48 and 50 to the transformer 20. The conductors 46, 48 and 50 are electrically connected to the electrodes 22, 24 and 26 and in this case are insulatively supported on the electrode support arms 28, 30 and 32 so as to isolate the power supply lines from the electrode support structures.

The flexibility of the line cables 52, 54 and 56 enables the electrode support structures to be raised and lowered without affecting the continuity of the line circuitry. Each of the flexible cables 52, 54 or 56 can be one or more water-cooled or air-cooled conductors supported in cable form by insulative rings or the like. The cables 52, 54 and 56 are long enough to permit the electrode movement and the tilting body movement as predetermined to be necessary for furnace operation.

In the typical furnace structure as shown in FIG. 1, the flexible cables 52, 54 and 56 are provided with substantially equal length and are disposed in a flat side-by-side array. Similarly, the conductors 46, 48 and 50 are disposed in a flat horizontal array, but one of the conductors is provided with a length different from the length of the other two conductors because of the preselected triangulated disposition of the electrodes 22, 24 and 26. In this example, the conductor 48 associated with the middle phase electrode 26 is shorter than the conductors 46 and 50 associated with the other two line circuits.

Since the line circuits are disposed in a flat geometric array and since the line circuits have different lead-in lengths, the respective line impedances for the lines 40, 42 and 44 differ from each other. In other cases, the conductors 46, 48 and 50 can be disposed in an equilateral triangular array, and the flexible cables 52, 54 and 56 can be disposed in an approximate equilateral triangular array in an endeavor to obtain a better balance of impedance for the three phases. However, in either approach, the line impedances are not fully balanced, and as the furnace 10 is operated and the electrodes 22, 24 and 26 are moved to different operating levels, additional differences in line impedances are created because of the variation in the locations of the conductors 46, 48 and 50, and the flexible cables 52, 54 and 56 as previously explained.

In FIG. 2, there is shown a control system 60 arranged in accordance with the principles of the invention to control the furnace operation. Part of the tilt platform 16 and part of the furnace body 12 along with a portion of a refractory furnace lining 62 are shown schematically in FIG. 2 in conjunction with the electrodes 22, 24 and 26. Material or steel charged into the furnace body 12 is subjected to large quantities of heat generated by means of the flow of arc currents between the electrodes 22, 24 and 26 and the material of the charge. The arcs are desirably kept relatvely short and stable in order to avoid excessive refractory hot spots, and the arc lengths, currents, and powers are controlled to establish improved arc balancing.

Once the furnace power operating level is determined, the arc voltages and currents are generally set to produce efficient transfer of power at a desirable power factor level from the transformer 20 to the arcs. The tap changing mechanism of the transformer 20 is operated to provide a predetermined secondary line voltage level. In some cases, the tap changer can be provided on a second transformer and the furnace transformer is then provided with a fixed ratio. However, the basic operating procedures discussed here are applicable in either case.

The electrode positions are controlled by drives 64, 66 and 68, such as those previously suggested, to operate at the selected system impedance, and thus at the desired arc current and power operating level with high power transfer efficiency at the transformer operating voltage. An electrode drive control 70, which can include a separate conventional rotating or solid state regulator (not shown) for each drive, controls the positioning of the electrodes 22, 24 and 26 in the electrode regulation system. Without additional system control, the electrode position regulation system produces arc imbalance in at least one of the primary arc characteristics of power, current, voltage, and length as a result of phase impedance imbalance.

To produce improved total arc balancing, by which it is meant to refer to balance of all the primary arc characteristics, an adaptive feedback control system 72 produces substantial balancing of the phase impedances during furnace operation. The adaptive feedback control 72 can be in analog form, but it preferably includes a process computer system 74 having a suitable digital logic design and being suitably programmed to achieve the feedback control operation subsequently described. Further, suitable digital-to-analog output equipment and suitable analog-to-digital input equipment is included in the system 74 where required in the feedback loop.

Although the electrode drive control 70 can be operated in an analog feedback loop in response to line metered parameters such as line current and line voltage, the control 70 is preferably incorporated into or operated by the process computer 74 in achieving electrode position regulation. Further, the transformer tap changing mechanism can be operated in the manual control mode, but it is also preferably controlled by the process computer 74 in selecting furnace operating voltage levels. The computer 74 is therefore preferably suitably designed and programmed to accommodate the transformer and electrode position control functions. However, such control is not necessary for the proper operation of the total arc balancing control. Specific detail on electrode position regulation apparatus and operation and transformer tap changing apparatus and operation is beyond the scope of the present disclosure and is therefore omitted.

In the adaptive feedback control system 72, current, voltage and phase angle sensing means 76 produce real time input variables to the computer 74. The current, voltage, and phase angle sensing means 76 can be a suitable metering system including suitably rated and commercially available watt, volt, and ampere meters having analog or digital outputs, although many other sensing means can be utilized. If the meter outputs are analog, the computer system 74 or the individual meters are provided with suitable conversion devices to generate digital computer input data.

The meter connections are made in this instance on the primary side of the transformer 20, and preferably in any application where the transformer operating secondary currents are at relatively high levels. The connections can also be made on the secondary side of the transformer 20 and, as subsequently explained more fully, voltage measurement connections are in that event preferably made as close as possible to the electrodes 22, 24 and 26. In the ideal case, the voltage connections would be made at the electrode faces in order to measure arc voltages and powers directly.

The current in each line, the line-to-line voltage, the voltage of each line to the grounded furnace shell 12, and the phase angle between line current and line-to-line voltage (obtainable for example by metering the power transfer through each line to the furnace 10) are continuously determined. The neutral point for the electrical circuit normally is at some point in the furnace conductive charge or melt; to determine line-to-neutral voltage, a suitable connection is established on the furnace shell 12 for line-to-ground voltage measurement. However, there is often an unbalanced neutral condition in which the neutral point is displaced from ground potential. This occurs in submerged arc furnaces and in direct arc furnaces such as steel melting furnaces during the melt-down state, which is the stage of operation when the furnace is operating at the highest power input. At such times, accurate phase voltage and power measurement are highly important, yet with an unbalanced neutral condition metered line-to-ground voltage is not an accurate gauge of the line-to-neutral voltage. For a more accurate determination, the line-to-neutral voltages are computed from the line-to-line voltages by the process computer 74.

Data required in the computer 74 such as current, voltage, watts and watt-hours data for controlling the transformer tap changer, the electrode position regulation sytem and the phase impedances can be obtained from a single current, voltage and phase angle sensing means 76 or from respective separate metering devices, if desired. As previously indicated, the primary cause of arc imbalance is phase impedance variation due to the fact that system resistive and reactive values change continually during the furnace operating cycle as the electrodes are raised or lowered to maintain the desired arc power input level. The computer 74 is therefore programmed to compute from the current and voltage and power data the phase impedance changes required to balance or nearly balance the phase impedances and the arc powers, currents, voltages and lengths.

The following circuit equation substantially describes the relation between current and voltage in each phase:

$$Z_{\text{phase}} = V/I = R_{\text{arc}} + R_{\text{system}} + jX_{\text{system}} + jX_{\text{reactor}}$$

where: system denotes the electrode supply circuitry. Arc power P is defined by the formula $I^2 R_{\text{arc}}$. Ideal total arc balancing is achieved when arc powers, currents and lengths are balanced, that is when:

$$P_1 = P_2 = P_3$$

$$R_{\text{arc 1}} = R_{\text{arc 2}} = R_{\text{arc 3}}$$

$$I_1 = I_2 = I_3$$

$$L_1 = L_2 = L_3$$

where: all of these quantities are expressed as scalar quantities. Normally, the reactances of the outside phases are almost equal to each other but somewhat different from the reactance of the center phase. Also, the resistive components of the three impedances differ from phase to phase although they are usually much less in magnitude than the arc resistance. That is, $$R_{\text{system}_1} \neq R_{\text{system}_2} \neq R_{\text{system}_3}$$

and $$X_{\text{system}_1} \cong X_{\text{system}_3} \neq X_{\text{system}_2}$$

Since the system resistive value is additive to the arc resistance and since the arc resistance is normally not directly measurable because of the heat of the arc, metering must be carried out at some distance from the arc. Current, voltage and phase angle metering connections are preferably all made at common points in each phase, and the metering is usually at such distance from the arc that the measurement includes at least some portion of the variable impedance circuit. In such case, the circuit resistance other than the arc resistance can be significant, and accurate arc resistance determination and accurate control of arc power requires a correction for the nonarc resistance.

Correction can be obtained by an analog or digital measuring system which provides data on the vertical position of each electrode arm. The computer 74 can then be employed to calculate the mutual inductance for each phase on the basis of the known geometry of the movable portion of the furnace electrical circuitry (mainly including the flexible cables 52, 54, 56 and the tubular conductors 46, 48 and 50). From this, the total of self and mutual inductances and resistances can be calculated and the arc resistance obtained by subtraction of the calculated resistance from the metered resistance. In cases where it is possible to meter voltage and power or phase angle at the electrodes, the supplementary calculation is not necessary for a determination of arc resistance. Other refinements in calculation, to compensate for skin effect and proximity effect in the flexible cables, tubular conductors, and electrodes can also be made through calculation preferably carried out by the computer 74 and based on known equations, formulas and tables.

In the impedance control loop, the computer is suitably programmed to make use of applicable formulas and operating parameters in making in-process calculations which define impedance changes needed for impedance balance control. The circuit resistances and reactances can be suitably calculated from the measured parameters, and imbalance in circuit impedances is then detected by the computer 74 through a comparison process. However, it is preferred that the arc resistance be determined as just described so that arc resistances and powers can be compared for use both in producing substantial impedance balance through the impedance control loop and in producing electrode position control in the electrode position regulation loop. Appropriate changes are accordingly continuously made in the impedance value of $X_{\text{reactor}}$ in any or each line to balance or nearly balance the line impedances and to produce substantially improved total arc balancing.

To effect impedance changes, a variable impedance device 78 is preferably connected in each of the power supply lines. However, on the basis that one phase inherently has greater impedance than the other two for a particular phase rotation of the supply voltage, it is sufficient to apply only two variable impedance devices, excluding the higher impedance phase. It is obviously also possible to apply only one variable impedance device to the phase with the lowest inherent impedance and to control the low impedance phase only for the purpose of obtaining a considerable degree of phase balancing with a minimum of equipment. The ability to utilize a single reactor with an effective increase in phase impedance balance depends on the magnitude and the range of the three system resistances. Two reactors provide for more desirable impedance balance control than does a single reactor.

The impedance devices 78 are preferably in the form of saturable core reactors. Each reactor 78 can, for example, be a commercially available two winding transformer with one winding connected in series in the line and the other winding connected to a DC power supply 80.

Each DC power supply 80 is in turn controlled by a suitable static saturation control device 82 for the purpose of controlling the magnetic flux level of the associated transformer core. The input of each static saturation control 82 is coupled to the ouput of the process computer 74, and ongoing computations made by the computer 74 operate the saturation controls 82 so as to vary the extent to which the saturable core reactors 78 are saturated and, accordingly, to vary the amount of impedance in each of the power lines toward line impedance balance. The adaptive feedback control 72 avoids the limitations and disadvantages of preset phase balancing schemes since it produces or nearly produces line impedance balance in response to ongoing changes in line impedance. Electrode position regulation thus ultimately produces improved in-process total arc balancing in response to the operation of the feedback control 72.

Since the variable reactors 78 directly change only the values of line reactance as adaptively operated under computer control and since the resistive components are not perfectly balanced, perfect impedance balancing or phase equalization of both the resistive and the reactive components cannot be obtained. However, since changes in line reactance do indirectly affect resistance values in other phase lines, the reactive components can be controlled to compensate materially for the differences in the different phase resistances. Perfect total arc balancing cannot be realized since the saturable core reactors 78 cannot produce perfect impedance balancing. However, materially improved total arc balancing is realized on an overall basis, and the furnace user determines the extent to which balance is desired in each of the arc parameters within the performance capability of the adaptive feedback control 72. The computer 74 is programmed to achieve the improved phase impedance balancing associated with the preselected arc balance conditions. The furnace 10 is then continuously operated at appropriate power levers with the preselected total arc balancing produced by the operation of the feedback control 72.

In FIGS. 3 and 4, there are respectively shown arc current and voltage waveforms for melt down and refining periods of steel furnace operation. During melt down, harmonic content in the waveforms is substantially greater than during the refining operation. Generally, the differences in harmonics are due to the differences in the temperature of the material in the furnace. As observed in FIG. 3, differences also exist between positive and negative half cycles when the cathode is formed respectively by the electrode and by the steel charge. The negative half cycle of FIG. 3 is less sinusoidal than the positive half cycle and has greater harmonic content than the positive half cycle.

As previously indicated, harmonics can affect line or phase reactance values, and the adaptive feedback control 72 can take harmonic effects into account in prescribing line impedance changes for total arc balancing purposes. The extent to which the adaptive feedback control 72 responds to line impedance imbalancing effects produced by current and voltage harmonics is principally determined by the responsiveness of the metering system 76 to current and voltages of elevated frequency. In a 60 cycle power supply system, metering response up to about 400 cycles is probably adequate for most applications.

In summary, the invention provides for improved control of electric arc furnaces. Improved total arc balancing is realized by means of line impedance balancing produced by an adaptive feedback control. The invention can be embodied in a variety of forms, and it is preferred that the feedback control include a digital computer which calculates required line impedance changes and controls variable reactors to make the impedance changes.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A control system for a multiphase electric arc furnace having a position regulated electrode for each phase supply circuit, said system comprising at least one variable impedance device connected in at least one of the arc furnace phase supply circuits, means for detecting predetermined electrical conditions at predetermined points of the arc furnace supply circuits during furnace operation, means for determining a representation of imbalances in the supply circuit impedances as a function of representations of the detected supply circuit electrical conditions, means for operating said impedance device to vary the impedance it provides in its phase supply circuit, and means responsive to said impedance imbalance determining means for controlling said impedance operating means to produce balancing of the supply circuit impedances and thereby enable better arc balancing to be achieved as the electrodes undergo position regulation during furnace operation.

2. A control system as set forth in claim 1 wherein a variable impedance device is included in each circuit and each impedance device is in the form of a saturable core reactor, and said operating means operates all of said impedance devices under the control of said controlling means.

3. A control system as set forth in claim 1 wherein said impedance imbalanced determining means and said controlling means include a digital computer system programmed to calculate required impedance changes from data including detected electrical voltage, current and power conditions.

4. A control system as set forth in claim 3 wherein furnace power is provided by a transformer and wherein said detecting means includes a metering system connected to measure voltages, currents and powers on the primary side of the transformer.

5. A control system as set forth in claim 1 wherein said system further comprises means for regulating the position of the electrodes to adjust the arcs toward balanced arc currents and powers and lengths as the supply circuit impedances are balanced during furnace operation.

6. A control system as set forth in claim 1 wherein said impedance device is a saturable core reactor and said impedance imbalance determining means and said controlling means include a digital computer programmed to calculate required impedance changes from data including detected electrical voltage, current and power conditions.

7. A control system as set forth in claim 1 wherein a three-phase furnace power supply is employed and wherein a variable impedance device is employed in each of the phase circuits, and said operating means operates all of said impedance devices under the control of said controlling means.

8. A control system as set forth in claim 7 wherein said impedance devices are saturable core reactors and wherein said impedance imbalance determining means and said controlling means include a digital computer system programmed to calculate required impedance changes from data including detected electrical voltage, current and power conditions.

References Cited

UNITED STATES PATENTS

| | | | |
|---|---|---|---|
| 2,758,144 | 5/1956 | Dreyfus | 13—12 |
| 3,162,800 | 12/1964 | Friedlander et al. | 13—12 X |
| 3,186,043 | 6/1965 | Murtland et al. | 13—13 X |

BERNARD A. GILHEANY, *Primary Examiner.*

ROY N. ENVALL, JR., *Assistant Examiner.*

U.S. Cl. X.R.

13—13; 317—27; 323—60